UNITED STATES PATENT OFFICE.

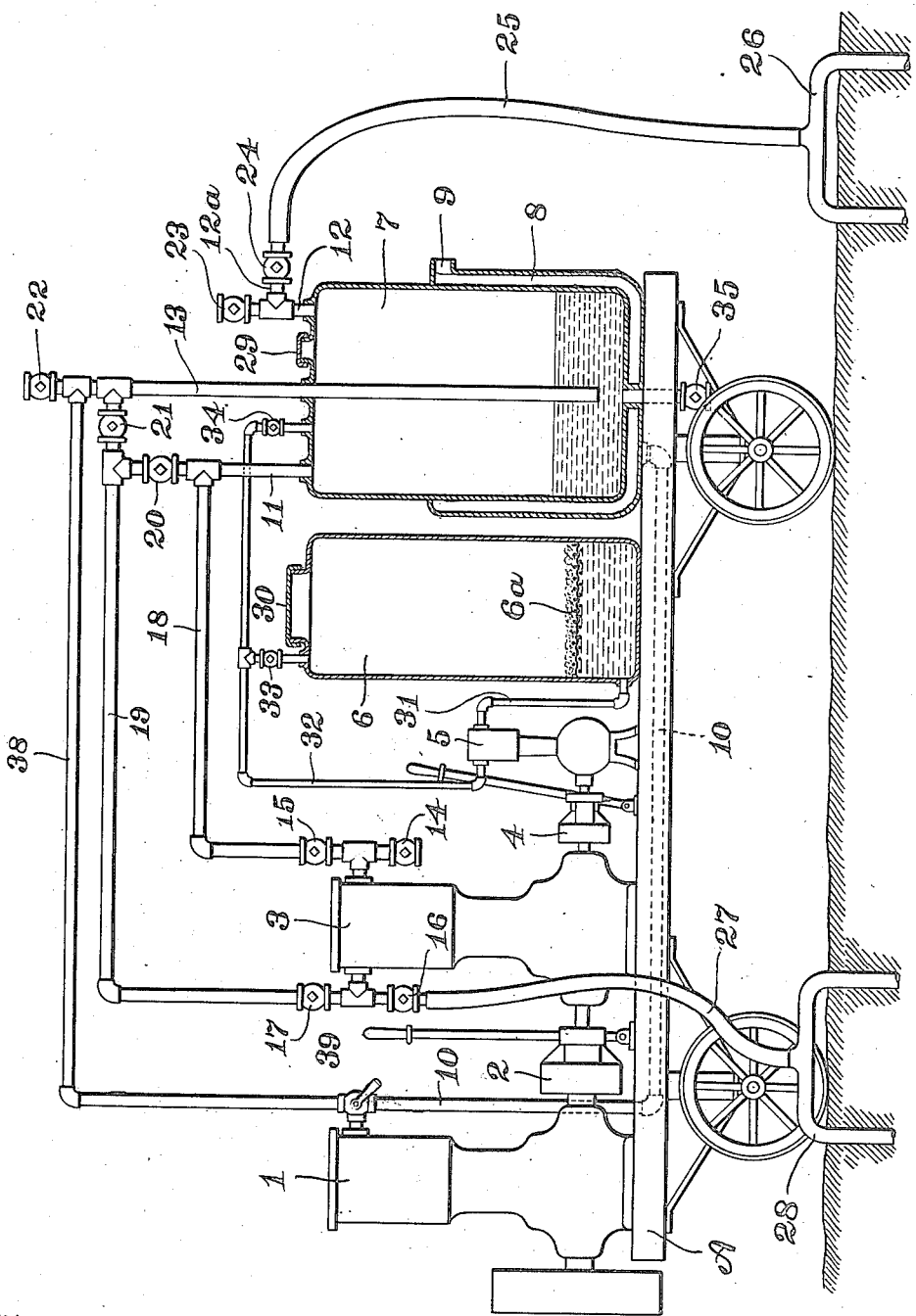

RALPH NELSON SARGENT, OF PERTH AMBOY, NEW JERSEY, ASSIGNOR TO THE ROESSLER & HASSLACHER CHEMICAL COMPANY, OF NEW YORK, N. Y., A CORPORATION OF NEW YORK.

APPARATUS FOR FUMIGATING.

1,222,677.

Specification of Letters Patent. Patented Apr. 17, 1917.

Application filed March 2, 1915. Serial No. 11,593.

*To all whom it may concern:*

Be it known that I, RALPH NELSON SARGENT, a citizen of the United States of America, and resident of Perth Amboy, in the county of Middlesex and State of New Jersey, have invented certain new and useful Improvements in Apparatus for Fumigating, of which the following is a specification.

My invention relates to new and useful improvements in apparatus for fumigating, and it refers particularly to that class adapted to be used with gaseous disinfecting agents, such as hydrocyanic acid, anhydrous sulfurous acid, chlorin, formaldehyde, carbon bisulfid and the like.

One of the objects of the invention is to apply the gaseous disinfecting agents under pressure and to provide means for a most effective and economical utilization of the applied fluids. Other objects and advantages will be referred to hereinafter and more particularly pointed out in the specification and claims.

The method now in common use in fumigating, for instance with hydrocyanic acid gas, is to distribute stoneware crocks or vessels throughout the space or compartment to be fumigated, placing in these vessels first water, then acid, and finally solid cyanid. The operator has to advance from one vessel to the next, thus entailing a great deal of work and a certain amount of danger. By this method the hydrocyanic acid gas is strongest near the generators and weakest in the corners and parts of the compartment farthest removed from the generators. This process, notwithstanding its many shortcomings, has proved tolerably efficient in the fumigation of trees under tents, but is cumbersome for the disinfection of compartments in buildings or boats or in any other location which occasionally needs disinfection to kill vermin or other low and undesirable forms of animal life. The greatest lack of efficiency of this old method or of any modification known up to now, is observable in the fumigation of the ground to kill beetles, worms and especially the pernicious *Phylloxera* on the roots of infected grape vines. There has been no fumigation process or apparatus up to the present permitting of universal application but I have succeeded in developing a process and apparatus suitable for such universal application and accomplishing, among other things, a solution of the problem of disinfecting the ground.

For the better understanding of my invention I shall describe the same, by way of example, as applied to the fumigation of the ground by means of hydrocyanic acid, reference being had to the accompanying drawing, in which a suitable arrangement of apparatus is shown in elevation, partially in section, and which, in a rather diagrammatic way, illustrates one form of apparatus preferably used for carrying my new process into effect.

In the drawing, A indicates a truck on which is mounted a source of power 1, preferably a gas engine, which is connected by means of a clutch 2, with a compressor 3, a pump 5 being connected to the compressor by means of a clutch 4. Adjacent pump 5 are located a tank 6 for cyanid solution provided with a screen 6ª to hold solid cyanid, and a gas generator 7, surrounded by jacket 8 with an outlet 9. A pipe 10 connects the exhaust of engine 1 with the jacket 8. The top of generator 7 is provided with two necks 11 and 12, and a tube 13 reaching nearly to the bottom of the generator. Both the intake and the outlet of the compressor 3 are connected to three-way tubes provided with valves 14, 15, 16 and 17, as shown. Neck 11 is connected with valves 15 and 17 by means of pipes 18 and 19 respectively, a valve 20 establishing connection between pipes 18 and 19, and a valve 21 connecting pipes 19 and 13. The upper ends of pipe 13 and neck 12 are provided with valves 22 and 23 respectively, and side-arm 12ª extending from neck 12 is provided with valve 24 to which a suitable hose 25 connected with a fork of soil tubes 26 is joined; a like hose 27 connected with a fork of soil tubes 28 is joined to valve 16 adjacent the compressor. The gas generator 7 and tank 6 are provided with suitable covers 29 and 30 respectively. There is a connection between pump 5 and the lower part of tank 6 by means of pipe 31, while the upper part of tank 6 and the upper part of generator 7 and the pump are connected by pipe 32 branching off into the tank and generator and carrying valves 33 and 34 respectively. The bottom of generator 7 is provided with a large discharge valve 35.

With regard to the operation of the apparatus, I wish to state that the hydrocyanic acid gas may be generated in the gas generator, for example, in either of two ways, either by treating therein a liquid consisting of sodium cyanid solution alone, or a liquid consisting of a mixture of sodium cyanid and a suitable acid, as for instance diluted sulfuric acid.

The cyanid solution alone may be used if, for instance, combustion gases of high temperature and carrying a large amount of carbonic acid gas, but practically free of unburned hydrocarbons, are available for its decomposition.

Assuming that the liquor in the gas generator consists of a mixture of dilute sulfuric acid and proportionate quantities of sodium cyanid solution, the process may be carried out in various ways depending on whether negative pressure or excess pressure is preferable according to the purposes of the situation. By opening either valve 22 or 23 air may be drawn through the liquor, or above it, as may be desired, the generator 7 being then under negative pressure, i. e. the mixture of hydrocyanid acid gas and air, hereinafter simply called "gas mixture" being sucked from the generator 7 through neck 11 and pipe 18 to the compressor 3 and thence driven through valve 16 into hose 27 to leave through the tubes 28, inserted in the ground. The process may, however, also be operated in such a way that generator 7 is under pressure above atmospheric pressure; in this case valve 16 is closed and air is drawn in through valve 14, to be discharged through or passed over the liquor in the generator 7 through pipe 13 or neck 11 respectively, as may be desired. The gas mixture is then driven out through neck 12 and hose 25 to leave through the soil tubes 26 inserted in the ground.

As indicated above, combustion gases of high temperature and containing a high percentage of carbonic acid gas may also be used very advantageously for the generation of hydrocyanic acid gas provided the motor works accurately enough to completely burn up the fuel charge. The use of carbon dioxid may be conveniently accomplished by connecting exhaust 10 with pipe 13 at a point below valve 22, the gas passing through a pipe 38 controlled by valve 39.

For the better understanding of my apparatus and process I will describe its operation by setting forth a specific example of the use of same by way of illustration, as follows:

In starting the operation I open valves 23, 15 and 16, and close valves 24, 14, 17, 22 and 20, start the engine and throw clutch 2 into gear. This will start the compressor and air will be drawn through valve 23 and will pass through neck 11, thence through pipe 18 and valve 15 to the suction side of compressor 3, thence through valve 16 and hose 27 and soil tubes 28 into the ground. Then I throw clutch 4 to start the pump 5. Cyanid solution will now be pumped from the bottom of tank 6 into the top of the generator 7 through valve 34; the stream of said cyanid solution may conveniently be regulated by opening or closing, more or less, the valve 33, thereby permitting some of the solution to circulate in the solution pumping system, without entering the generator.

Hydrocyanic acid will be developed when the solution mixes with the diluted acid in the generator; this acid should be of sufficient temperature (say between 60–100° C.) so that hydrocyanic acid gas will be evolved, which will then mix with the air and leaving in the direction indicated by arrow 36, is pumped through the pipe system referred to above to finally enter the ground.

In another example, which I am about to describe, the gas generator 7 is under a pressure above the atmospheric pressure. To accomplish this I open valves 14, 17, 21, 24 and close valves 15, 16, 22, 23 and 20. I then start the engine 1 and connect compressor 3 with the same by clutch 2; air then enters through valve 14 and passes through valve 17, pipe 19, valve 21 and pipe 13 through the liquor in the generator, whereupon it leaves through neck 12, valve 24 and hose 25, to enter the ground through tubes 26. If the pump 5 is now thrown into action, cyanid solution will be discharged into the acid and the hydrocyanic acid gas will mix with the air, the desired gas-mixture now entering the ground through the tubes 26.

Many well known and efficient gaseous disinfecting agents, such as sulfur dioxid, chlorin, formaldehyde, etc., may be produced and applied in the same way as described above and it is evident that volatile substances also, such as carbon bisulfid may equally well be applied by my new apparatus and process, as carbon bisulfid for example, is easily evaporated by conducting a draft of a suitable gas, as for instance combustion gases, over the mass of the carbon bisulfid or by bubbling the combustion gases through the same.

It is of course understood that any gas which is not detrimental to the ground or to valuable things growing or existing in the same, and which also behaves generally like an inert gas toward the gaseous disinfecting agent, may be used to partly or entirely substitute the air as a dilutent of the hydrocyanic acid gas or of any other gaseous disinfecting agent which may come into consideration for application by my apparatus;

such inert gases are for instance nitrogen, or combustion gases, which latter, as already indicated above, would also have a beneficial influence in this regard in case the generation of the hydrocyanic acid is necessary, for instance.

The advantages of my new apparatus and process over the prior art are great and important for I have found that it is impossible to disinfect the ground according to the prior art, for instance by means of hydrocyanic acid, for the reason that this agent, if developed and pumped into the ground unmixed, i. e. without any diluting gas, condenses or reacts with the soil very quickly, and therefore does not diffuse through the same and is thus lost without any beneficial result. It is necessary, as I have found, to carry the hydrocyanic acid gas into or through the ground by aid of air or other suitable gas as the admixed gas aids the diffusion of the disinfecting agent through the ground and as the large volumes of diluting gas prevent the highly volatile hydrocyanic acid gas from condensing at the temperature naturally coming in question, or at least reduce its condensation below the harmful degree, the obtained results being most advantageous and superior to those given by any other method.

My new apparatus and process is also free from the haphazards of the old processes resulting from spilling of acid or from the loss and danger from undecomposed residue, inasmuch as my new apparatus permits a most convenient and perfect control of all the various steps of the process, as for instance, the admission of the cyanid solution to the sulfuric acid, and as the latter is always maintained in excess, a complete decomposition of the more expensive cyanid is obtained and guaranteed.

My new apparatus and process is also of a universal application because it may be used equally well for the fumigation of trees under tents, for compartments in buildings or ships or for any other purpose where disinfection may become desirable. A further considerable advantage in this respect is afforded by my new apparatus and process inasmuch as it permits a thorough diffusion of the air within the space of the compartment because by suitable piping systems the gaseous disinfecting agent may be equally well brought to all parts of the space. In all these uses my improvement renders it possible to locate the fumigating machine outside the respective compartment, the gas mixture containing the hydrocyanic acid being most conveniently forced into the compartment from without through a hose by means of the machine as described. The many different applications to which my new apparatus and process is suitable suggests that deviations from the arrangements here described may be easily made, said deviations, however, being within the spirit of the invention and I do not restrict myself to any of the details described further than the scope of the appended claims demands.

I claim:

1. In an apparatus for fumigating, the combination of a compressor, a tank and a gas generator, a connection between said compressor and said generator, a pump connected to said tank and said generator and means for driving said compressor and pump.

2. In an apparatus for fumigating, the combination of a compressor, a tank and a gas generator, a connection between said compressor and said generator, a pump connected to said tank and said generator, a jacket for said generator and means for driving said compressor and pump.

3. In an apparatus for fumigating, the combination of a compressor, a tank and a gas generator, a pipe passing through the cover of the generator and extending nearly to the bottom thereof, and a plurality of necks connecting with said generator, a connection between said pipe and said compressor and between one of said necks and said compressor, a pump connected to said tank and said generator, and means for driving said compressor and pump.

4. In an apparatus for fumigating, the combination of a compressor, a tank and a gas generator, a pipe passing through the cover of said generator and extending nearly to the bottom thereof, a connection from said pipe to the pressure side of said compressor, a connection from said generator to the suction side of the compressor, a connection between said two connections, a connection to said generator from the outside, a pump connected to said tank and said generator, and means for driving said compressor and pump.

5. In an apparatus for fumigating, the combination of a compressor, a tank and a gas generator, a connection between said compressor and said generator, a pump connected to said tank and said generator, a by-pass connection from said last-named connection to said tank, and means for driving said compressor and pump.

6. In an apparatus for fumigating, the combination of a compressor, a tank and a gas generator, a pipe passing through the cover of the generator and extending nearly to the bottom thereof, a connection from said pipe to the pressure side of the compressor, a discharge connection from the pressure side of the compressor, a connection from the generator to the suction side of the compressor, an inlet connection on the suction side of the compressor, a cross connection between the pipe connection and compressor connection of the generator, a discharge connection from the generator, an air inlet associated with said discharge connection, a pump connected to said tank and said generator, a by-pass connection from said last-named connection to said tank, and means for driving said compressor and pump.

7. In an apparatus for fumigating, the combination of a gas engine, a compressor, a tank and a gas generator, a connection between said compressor and said generator and between said tank and said generator and means for conveying the waste products of combustion from the gas engine to the generator.

8. In an apparatus for fumigating, the combination of a compressor, a tank and a gas generator, a connection between said compressor and said generator, a pump connected to said tank and the generator, a set of soil tubes, a connection from the high pressure side of the compressor and said soil tubes, a second set of soil tubes, a connection from the generator to said second set of soil tubes, valve controlled means for directing the flow of gas through one or the other of said sets of soil tubes and means for driving said compressor and pump.

In testimony whereof I have signed this specification in the presence of two subscribing witnesses.

RALPH NELSON SARGENT.

Witnesses:
ARTHUR L. GARDNER,
OTTO K. ZWINZENBERGER.